United States Patent [19]
Warren

[11] Patent Number: 5,901,973
[45] Date of Patent: May 11, 1999

[54] CONTROL SYSTEM FOR PEDAL DRIVEN VEHICLES

[76] Inventor: Michael Warren, 2 Ross Ave., Demarest, N.J. 07627

[21] Appl. No.: 08/693,674

[22] Filed: Aug. 13, 1996

[51] Int. Cl.[6] .............................. B62K 23/06; B62M 1/02
[52] U.S. Cl. .......................... 280/260; 280/264; 280/267; 280/282
[58] Field of Search .................................... 280/260, 261, 280/259, 264, 282, 267

[56] References Cited

U.S. PATENT DOCUMENTS

| | | |
|---|---|---|
| 528,956 | 11/1894 | Lippy et al. . |
| 595,242 | 12/1897 | Usher . |
| 1,360,032 | 11/1920 | Schiffner et al. . |
| 1,380,082 | 5/1921 | Schleder . |
| 1,535,714 | 4/1925 | Burke . |
| 3,498,634 | 3/1970 | Sheldon . |
| 3,718,344 | 2/1973 | Lohr et al. . |
| 3,913,929 | 10/1975 | Matsuura . |
| 4,456,277 | 6/1984 | Carpenter ................................ 280/282 |
| 4,502,705 | 3/1985 | Weaver ................................... 280/261 |
| 4,674,762 | 6/1987 | Nelson et al. . |
| 4,705,284 | 11/1987 | Stout ...................................... 280/282 |
| 4,826,190 | 5/1989 | Hartmann . |
| 5,069,469 | 12/1991 | Rosengrant et al. .................... 280/282 |
| 5,209,507 | 5/1993 | Domenge . |
| 5,501,478 | 3/1996 | Doan ...................................... 280/267 |
| 5,544,906 | 8/1996 | Clapper ................................... 280/282 |
| 5,568,935 | 10/1996 | Mason .................................... 280/282 |

*Primary Examiner*—Anne Marie Boehler
*Attorney, Agent, or Firm*—Helfgott & Karas, P.C.

[57] ABSTRACT

A foot-pedal operated cart includes a dual derailleur transmission system operated by a pair of multi-function control handles. The control handles each include a pair of hand-operated actuators for controlling a ratchet and pawl mechanism for respectively indexing the derailleurs over a pair of speed change sprocket clusters. The control handles are also connected to a steering system and braking system to allow a driver to control each system via the control handles.

11 Claims, 6 Drawing Sheets

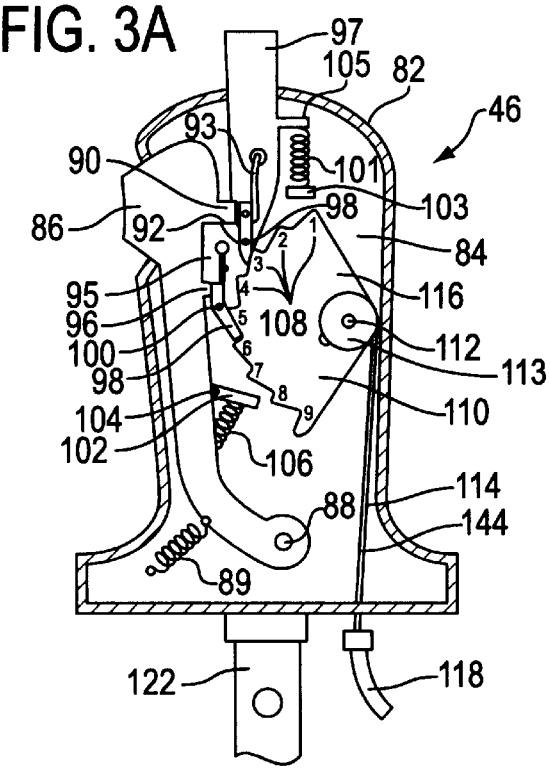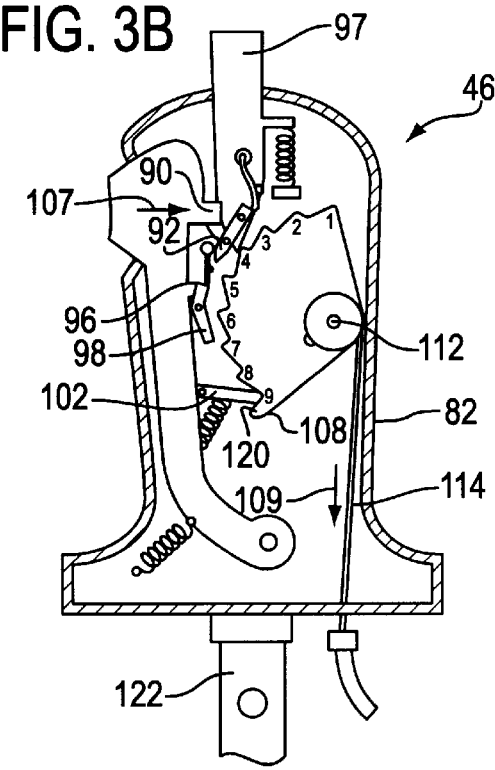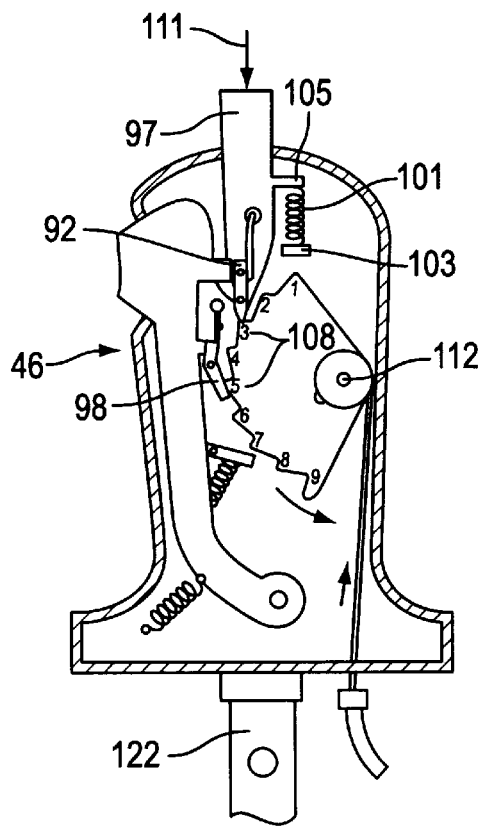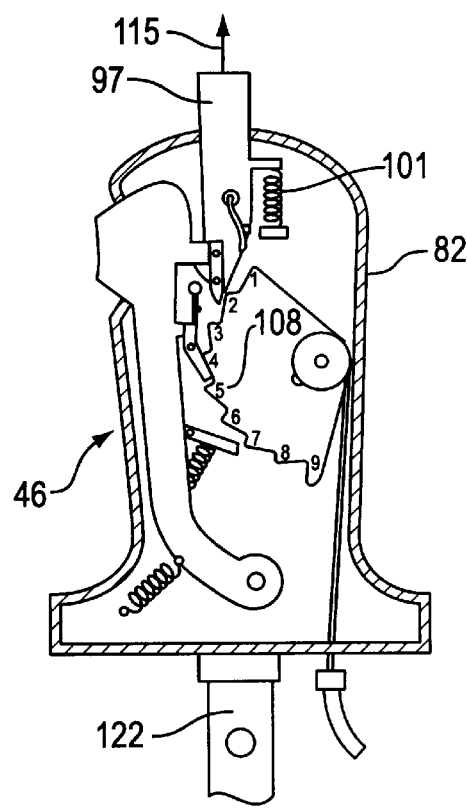

CONTROL SYSTEM FOR PEDAL DRIVEN VEHICLES

BACKGROUND OF THE INVENTION

1. Field of the Invention

The present invention relates generally to chain driven vehicles and particularly relates to a racing cart having a dual derailleur transmission actuated by a pair of trigger-operated ratchet and pawl mechanisms mounted within a pair of multi-function control handles which provide steering and braking functions as well.

2. Description of Prior Developments

Dual derailleur transmission systems for foot powered vehicles are well known and have been applied, for example, to tandem bicycles as shown in U.S. Pat. Nos. 5,209,507 and 4,502,705. While these parallel chain drive systems perform adequately for their intended purposes, that is, to allow two riders to match their respective pedalling speeds, they do not adequately address the problems associated with recumbent or semi-recumbent racing carts powered by a single rider, i.e. improving the speed characteristics of the carts.

In particular, it is desirable to maintain the center of gravity of a three or four wheel racing cart as low to the ground as possible in order to provide improved cornering and maneuverability. It is also desirable to facilitate the operation of the derailleurs so as to allow simultaneous steering, braking and shifting functions with a single hand-held control assembly.

In prior dual derailleur systems, one derailleur actuator or shift lever operates in one direction, i.e. clockwise, and the other derailleur actuator operates in the opposite direction, i.e. counterclockwise, to increase or decrease the overall gear ratio between the foot pedal sprocket and the driving sprocket connected to the road wheel. In some cases, this has caused operator confusion resulting in an upshift when a downshift is intended and vice versa.

Prior derailleur systems typically have been operated with shifting assemblies attached to some portion of a bicycle frame remotely located from the handle bar hand grips. This arrangement requires temporary removal of the driver's hands from the hand grips in order to shift gears. In some cases, this can lead to a lack of steering control during turning maneuvers and is generally considered inconvenient.

Accordingly, a need exists for a dual derailleur transmission system which allows for the mounting of relatively small diameter sprockets and chains extremely close to ground level in order to lower the center of gravity of a foot powered vehicle and thereby improve its maneuverability.

Another need exists for a chain driven racing vehicle which minimizes chain slack and resists disengagement of a chain from its front sprockets.

A further need exists for a dual derailleur system which provides consistent upshifts and downshifts with a pair of hand held shift assemblies.

Still a further need exists for a dual derailleur system which is actuated by a pair of control handles, each of which provides upshifts and downshifts while allowing a rider to maintain a full grip on the steering and braking mechanisms.

Another need exists for a dual derailleur system which combines three control functions within a single hand grip, i.e. steering, braking and gear shifting.

SUMMARY OF THE INVENTION

The present invention has been developed to fulfill the needs noted above and therefore has as an object the provision of a dual derailleur transmission system for a foot powered cart which allows for the mounting of the majority of the powertrain chains, shafts and sprockets at a point close to ground level to provide a low center of gravity for improved cornering and handling.

Another object of the invention is to provide a multi-function hand grip which provides for steering control, brake operation and gear shifting without requiring release of the hand grip.

Still another object of the invention is to provide a pair of coordinated trigger operated derailleurs which provide upshifts (or downshifts) when fully actuated so as to provide consistent "same way" shifting functions thereby eliminating any possibility of an unintended downshift (or upshift).

Another object of the invention is to provide a hand held ratchet-operated gear shifter which can be used on both racing carts and bicycles.

Yet another object of the invention is to provide a racing cart with a monocoque construction in which a plastic outer shell carries the major portion of the stresses. With this construction, the rear wheels can be mounted on short individual axles.

Another object is to provide a chain drive which includes three chains connected in series with the front and rear chains controlled by a pair of derailleurs. This arrangement provides for a discrete gear ratio on each shift thereby making all possible speeds available for a given number of sprockets. That is, there is no duplication of gear ratios created by different gear settings in the drive system of the present invention.

Yet another object of the invention is to provide a chain drive having a central or middle chain which provides an additional fixed gear ratio which can compensate for small diameter rear wheels. This, in turn, provides greater gearing capacity, efficiency and speed.

These and other objects are met by the present invention which includes a foot crank pedal which is mounted in a front portion of a racing cart. The pedal crank shaft is mounted high enough above ground level to provide pedal ground clearance and to allow for efficient power transfer from an operator sitting or reclining in the cart. The crank shaft is fixed to a primary drive sprocket which is linked to a first gear set by a forward or first drive chain. A first derailleur is connected to the first drive chain for selectively engaging various gears within the first gear set to provide various transmission drive ratios.

An additional chainwheel is connected to and rotates with the first gear set on a common shaft for transferring drive power via an intermediate or second transfer chain to an intermediate transfer sprocket mounted to one end of an intermediate transverse drive shaft. A lower or secondary drive sprocket is fixed to the other end of the transverse drive shaft for transmitting drive power to a rear or second gear set via a third or rear drive chain. A second derailleur is connected to the rear drive chain for selectively shifting between the gears in the rear gear set.

The first derailleur is controlled by a first trigger and push button mechanism mounted within a first hand grip and the second derailleur is controlled by a second trigger and push button mechanism mounted within a second hand grip. The trigger and push button mechanisms are connected to the respective derailleur via cables in such a manner that each pull of each trigger results in an upshift in each respective derailleur. Downshifting is accomplished with a simple thumb actuation of a push button mechanism. In this manner, the operator need not commit to memory which derailleur actuator provides an upshift or downshift in any particular direction of actuation.

The hand grips also are connected to a pair of individual caliper brakes associated with a pair of rear wheels, as well as to a common steering linkage which may be controlled by either one or both of the hand grips. In this manner, complete control of the cart is possible without requiring the driver to release a full grip on the hand grips. This provides greater continuous, uninterrupted control over the vehicle.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIGS. 3A through 3D are side elevation views, in section, of a hand grip constructed according to the invention, taken along line 3A—3A of FIG. 1 and depicting the actuation of a derailleur cable with a trigger and push button mechanism;

In the various figures of the drawings, like reference characters designate like parts.

DETAILED DESCRIPTION OF THE PREFERRED EMBODIMENTS

Figure 1:
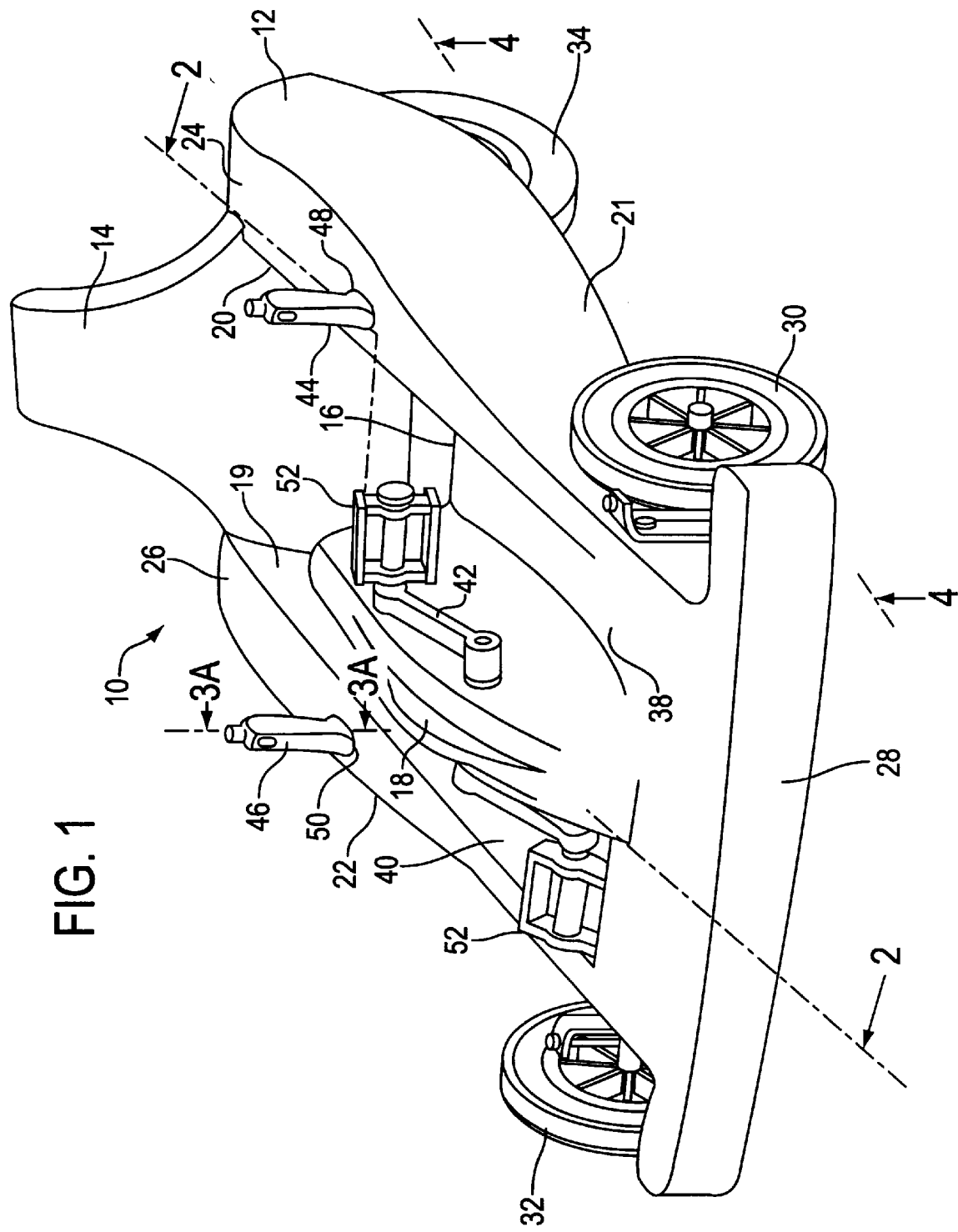
FIG. 1 is a front perspective view of a racing cart constructed in accordance with the invention.

The present invention will now be described in conjunction with the drawings, beginning with FIG. 1, which shows a racing cart 10 having a body 12 which may be formed as a one-piece monocoque molding or fabricated from individual components. Body 12 includes a back rest 14, a seat and floor section 16, and a central crank housing 18 extending upwardly from a central portion of the floor section. The body further includes a pair of inner side walls 19,20 and outer side walls 21,22 which extend upwardly to a pair of top walls 24,26 which serve as arm rests for the driver.

A front bumper 28 may be provided on body 12 so as to extend transversely in front of tires 30,32. The rear tires 34,36 (FIG. 4) may be partially covered by the side walls 21,22. A pair of recessed pedal channels 38,40 is defined between the inner sidewalls 19,20, the floor section 16, and the crank housing 18.

A conventional pedal crank 42 is mounted to crank housing 18 and a pair of multi-purpose control handles 44,46 extend through clearance openings or slots 48,50, respectively formed through top walls 24,26. Foot pedals 52 are mounted at a predetermined height above floor section 16 so as to provide optimum leverage and power transmission from a driver's legs to pedal crank 42.

The first and second control handles 44,46 are positioned with respect to back rest 14 so that the hands of the cart driver are naturally positioned to grip and actuate the handle controls as the driver's back is firmly supported by back rest 14. This back support allows the drive to apply power efficiently to pedal crank 42.

Figure 2:
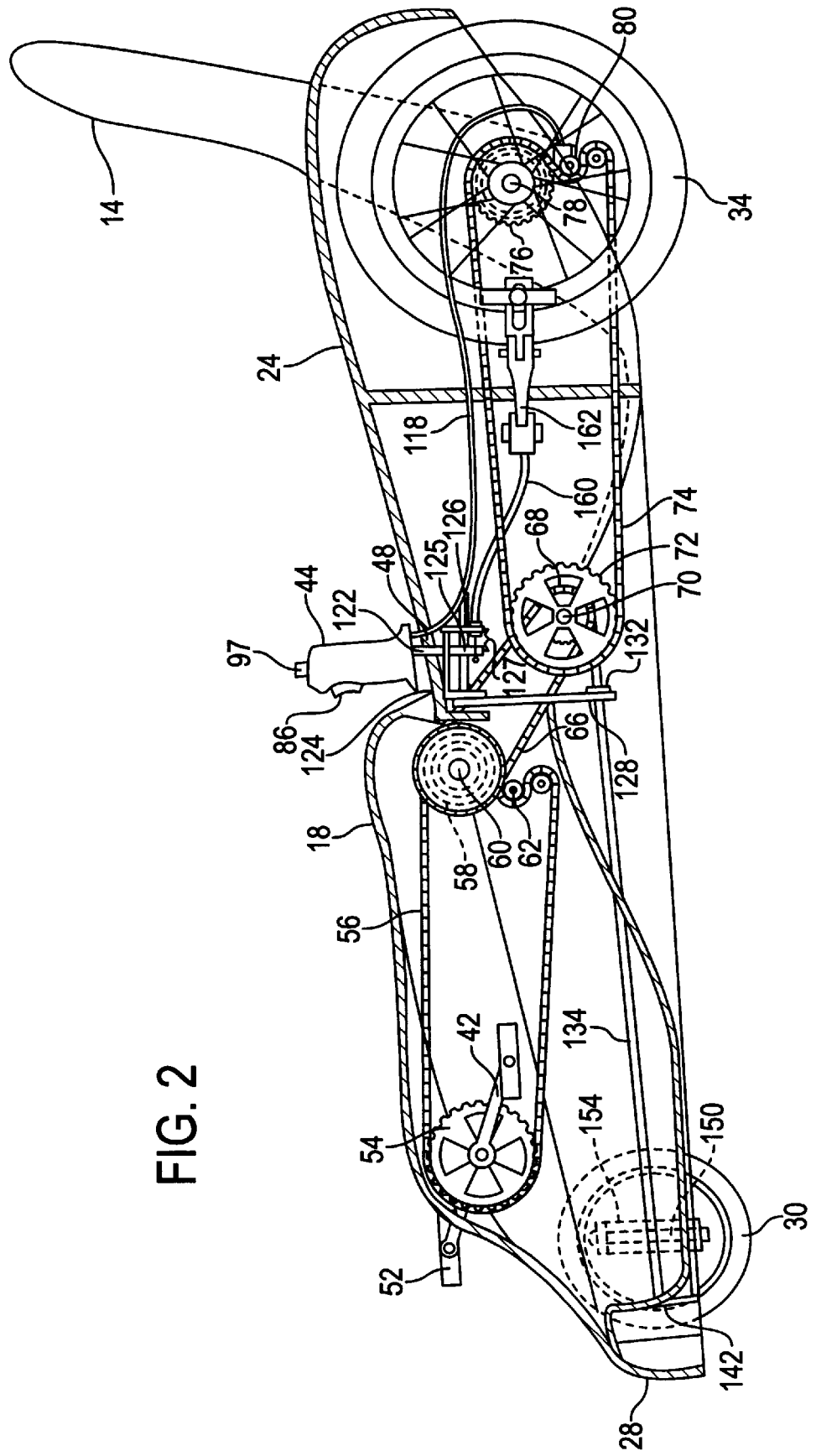
FIG. 2 is a longitudinal side elevation view, in section, taken along line 2—2 of FIG. 1.

Details of the dual derailleur transmission system are seen in FIG. 2 wherein pedal crank 42 is shown connected to an upper or primary drive sprocket 54. A forward or first drive chain 56 interconnects the primary drive sprocket 54 with a forward, upper or first gear set 58 which includes two or more speed change sprockets or chainwheels of equal gear pitch but varying diameter, fixed to a forward upper shaft 60 mounted and housed within the rear end portion of the central crank housing 18.

A first, front or forward derailleur 62 is connected to the first drive chain 56 in a known fashion for selectively shifting chain 56 into and out of driving engagement with individual gears within the first or front gear set 58.

An additional upper chainwheel or sprocket 64, seen in FIG. 2 is carried by the first gear set 58 and is interconnected by intermediate transfer chain 66 with intermediate transfer sprocket 68. Chain 66 extends downwardly from chainwheel 64 to engage intermediate transfer sprocket 68 which is constantly in mesh with chain 66.

Intermediate transfer sprocket 68 is mounted on one end of an intermediate transverse drive shaft 70 and a lower or secondary drive sprocket 72 is mounted onto the other end of shaft 70. Intermediate drive shaft 70 is mounted to a rear end portion of the central crank housing 18 and extends under floor 16 from a point beneath the crank housing 18 to a point below top wall 24. A third or rear drive chain 74 is connected at its front end to secondary drive sprocket 72 and at its rear end to a second or rear gear set 76 provided with a plurality of conventional speed change sprockets or gears on common shaft 78.

A second or rear derailleur 80 is connected to rear chain 74 for selectively shifting chain 74 into and out of engagement with the varying sized gears provided within the rear gear set 76. The front or first derailleur is controlled by control handle 46 and the second or rear derailleur is controlled by control handle 44 as described further below.

In an alternative embodiment, secondary drive sprocket 72 may comprise a gear set including two or more speed change sprockets or chainwheels of equal gear pitch but varying diameter for increasing still the speeds available to the vehicle user.

As seen in FIG. 3A, control handle 46, which is identical in structure and function to control handle 44, is formed with a hollow hand grip body 82 within which a trigger and push button operated derailleur actuator mechanism 84 is mounted. Mechanism 84 includes a first actuator or trigger 86 which is pivotally mounted to grip body 82 via pin 88. Coil spring 89 pulls trigger 86 in a counterclockwise direction about pin 88 so as to pull trigger 86 outwardly from grip body 82 for engagement with a driver's index finger.

Trigger 86 includes a first fixed projection or abutment 90 for selectively releasing a downshift ratchet pawl 92 which is pivotally mounted on a second actuator 97 within grip body 82 via pin 94. A second fixed projection or abutment 96 is provided on trigger 86 for selectively releasing a position ratchet pawl 98 which is pivotally mounted within grip body 82 via pin 100.

An upshift stop pawl 102 is pivotally mounted to trigger 86 via pin 104 and biased upwardly and outwardly away from trigger 86 via compression coil spring 106. Downshift pawl 92 and position pawl 98 and stop pawl 102 are spaced apart by predetermined amounts so as to be selectively sequentially engageable with ratchet teeth 108 formed on ratchet 110. Ratchet 110 is also pivotally mounted within grip body 82 via pivot shaft 112.

Leaf spring 93 biases downshift pawl 92 toward and into engagement with teeth 108 of ratchet 110 and leaf spring 95 biases position pawl 98 toward and into engagement with teeth 108 of ratchet 110. Spring 93 is mounted on the second movable actuator 97 and spring 95 is mounted in a fixed position within grip body 82.

Actuator 97 is mounted with a sliding fit within grip body 82 and is adapted to be depressed and released by a driver's thumb as a thumb actuated push button. Coil spring 101 is mounted within grip body 82 on ledge 103 so as to bias actuator 97 upwardly and outwardly from grip body 82 via engagement with abutment 105 on actuator 97.

One end of a derailleur control cable 114 is fixed to a pulley means 113 mounted to an upper flat portion 116 positioned around pivot shaft 112 of ratchet 110 and the other end is fixed to the first or forward derailleur 62 in a known fashion. A protective cable sheath 118 is provided over the length of cable 114 in a known manner. The forward derailleur 62 is configured so that each actuation of trigger 86 via clockwise rotation about pin 88 will cause the forward derailleur to index the forward chain 56 onto the next sprocket which will provide a higher gear ratio and faster speed.

More particularly, as shown in FIG. 3B, as trigger 86 is depressed in the direction of arrow 107, stop pawl 102 engages the flat surface portion 120 of ratchet teeth 108. Downshift pawl 92 and position pawl 98 are then pivoted out of engagement with ratchet teeth 108 via respective engagement with trigger abutments 90,96. As the pawls 92,98 clear the ratchet teeth 108, ratchet 110 is freed to rotate clockwise under the downward pulling tension applied by control cable 114. This tension is provided by the spring bias applied to the cable 114 by a conventional spring mechanism associated with forward derailleur 62. The clockwise rotation of ratchet 110, however, is limited by a counterclockwise force applied to ratchet 110 by the engagement of coil spring biased stop pawl 102 on the flat face portion 120 of one of the ratchet teeth 108.

At this point, trigger 86 is released which in turn releases stop pawl 102 allowing pawl 98 to seat against the next lower ratchet tooth from its prior engagement and thereby return to the general position of FIG. 3A. In this manner, successive actuation of trigger 86 will sequentially effect shifting of one higher gear per trigger pull.

Downshifting is accomplished by depressing actuator 97 into grip body 82 such as by thumb pressure as represented by directional arrow 111 in FIG. 3C. As actuator 97 slides into grip body 82, downshift pawl 92 engages a ratchet tooth 108 and forces ratchet 110 downwardly in a counterclockwise rotation about pivot shaft 112. Downward movement of actuator 97 is limited by the bottoming out or full compression of coil spring 101 between abutment 105 and ledge 103. At this point, pawl 98 has passed over one of the ratchet teeth as the teeth pivot against position pawl 98.

As thumb pressure is removed and actuator 97 is returned to its original rest position by spring 101, as shown in FIG. 3D by directional arrow 115, ratchet 110 is prevented from rotating clockwise to its prior rest position by position pawl 98 engaging one of the teeth 108. The tooth engaged by position pawl 98 is now spaced one tooth away from the tooth engaged by position pawl 98 prior to actuation of actuator 97. Additional actuation of actuator 97 will result in further counterclockwise ratcheting of ratchet 110.

This rotation of ratchet 110 by thumb actuator 97 pulls cable 114 upwardly and around pulley means 113 and thereby indexes the front derailleur 62 to a position aligned over the next lower gear on front upper gear set 58 so as to reduce the gear ratio and effect a downshift. An identical trigger and push button actuated ratchet and pawl actuator mechanism is provided in control handle 44 for indexing the rear derailleur 80 over the sprocket gears of the rear gear set 76.

In addition to providing derailleur actuation and control, each control handle 44,46 is connected to a steering system via a common steering linkage to allow a driver to steer the front tires 30,32 without releasing the driver's grip on the control handles.

Figure 4:
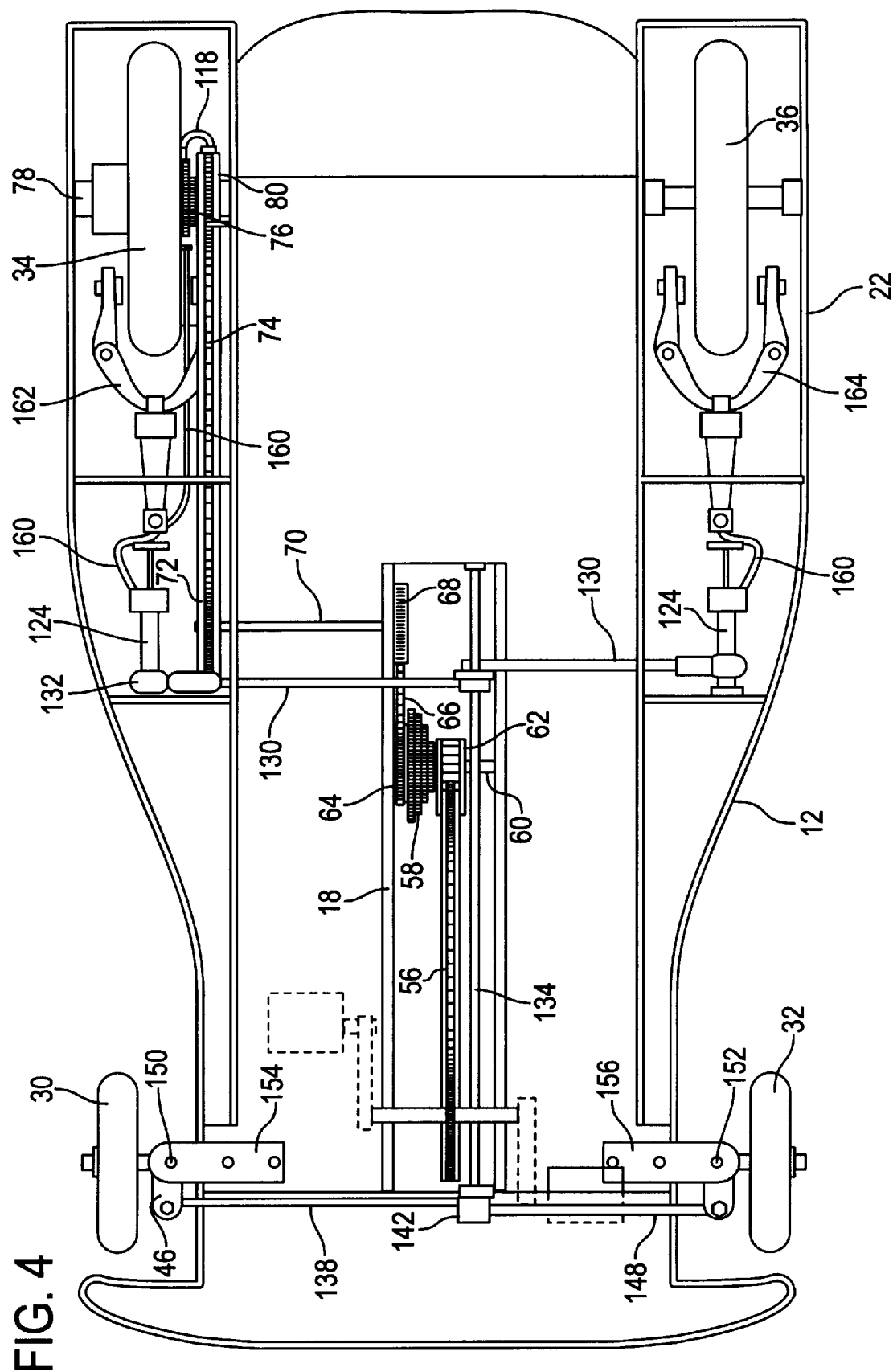
FIG. 4 is a bottom view of the cart of FIG. 1, as seen along section line 4—4 thereof.
Figure 5:
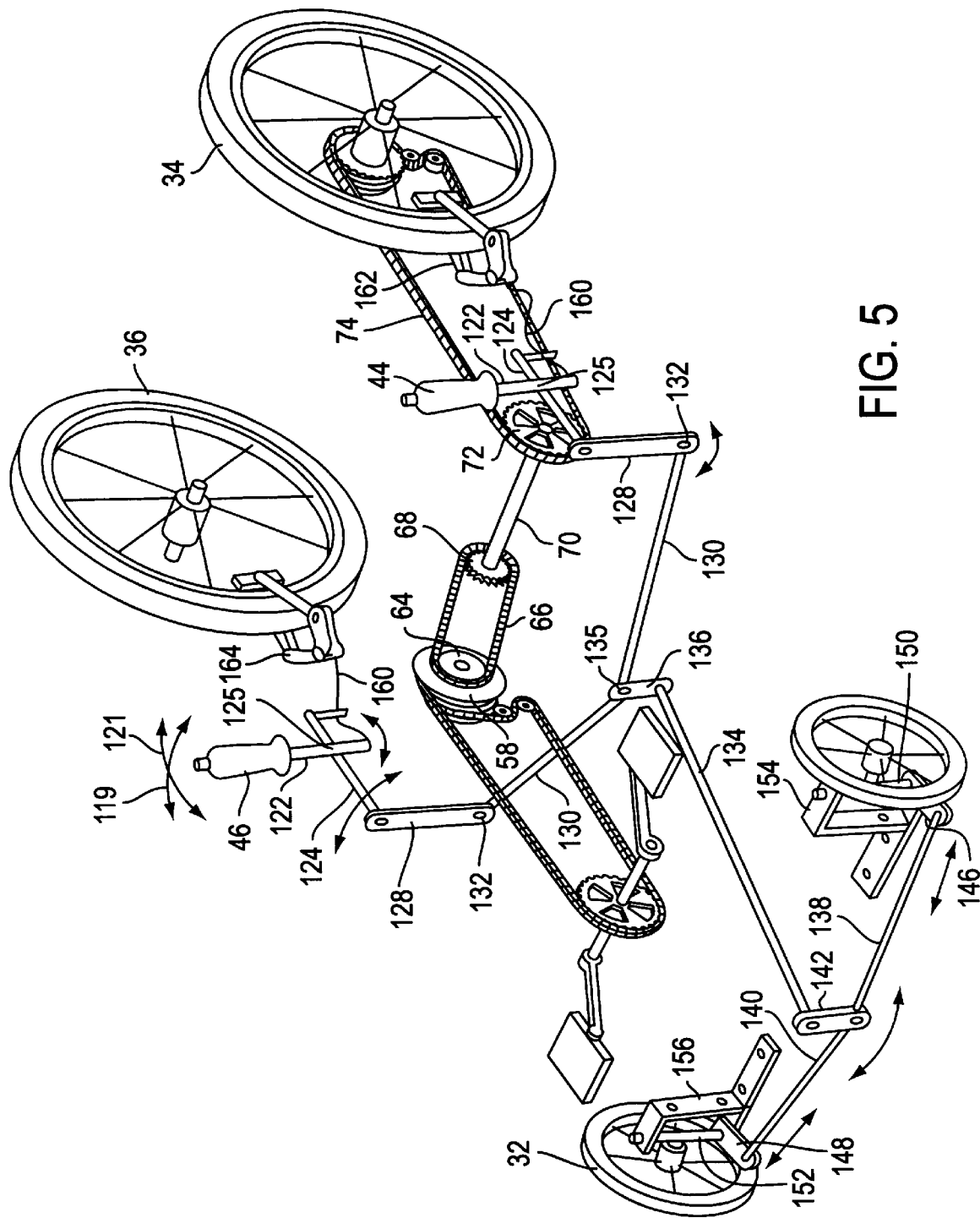
FIG. 5 is a schematic perspective view of a pair of multi-purpose control handles constructed in accordance with the invention and depicting their interconnection to a steering system and braking system.

As seen in FIGS. 2 through 5, each control handle 44,46 is mounted on a joy stick 122 which is transversely movable from side to side (left to right) and from front to rear as respectively indicated by directional allows 119,121 in FIG. 5. A transverse pin 125 allows the joy stick to pivot freely from front to rear about pin 125 in the direction of arrow 121 without causing rotation or movement of shaft 124 to which it is pinned. Side to side movement of joy stick 122 effects rotation of shaft 124 about its longitudinal axis and thereby effects right and left turning movement of the front tires 30,32 as described below.

In the case of the left control handle 44 (or right control handle 46) as depicted in FIGS. 2, 4 and 5, joy stick 122 is shown connected to a pivotable shaft 124 which is mounted within side wall 20,21 of cart body 12. A steering arm 128 is connected and rigidly fixed at its upper end to shaft 124 and pivotally connected at its lower end to the outer end of transverse steering link 130 (FIGS. 4 and 5) via pivot joint 132. Steering link 130 is pivotally connected at its inner end to a rear end portion of central common steering shaft 134 via pivot pin 135 on the top of pivot link 136.

The rear end portion of steering shaft 134 is rigidly fixed to the lower end of pivot link 136 and front end portion of steering shaft 134 is rigidly fixed to the upper end of a front pivot link 142. A pair of front steering bars 138,140 are pivotally connected to the lower end of the front pivot link 142. The outer end of each front steering bar is pivotally connected to one arm 146,148 of a wheel crank for pivoting the front tires 30,32 about vertical pivot shafts 150,152. Each pivot shaft is pivotally mounted in a wheel yoke 154,156 which is fixed to the cart body 12.

By tracing the movement of the steering linkage, it can be appreciated that movement of either joy stick 122 to the right will cause the front tires 30,32 to steer to the right and movement of either joy stick 122 to the left will cause the front tires to steer to the left. Each control handle 44,46 is connected by a similar linkage system to the central common steering shaft 134 so that the cart driver can steer with either one of the control handles or both control handles at once.

Each control handle provides yet another control function, namely, control of a braking system. By moving either one or both joy sticks 122 rearwardly, either one or both of a pair of caliper brakes may be applied to the rim of the rear tires. For example, as seen in FIGS. 2, 4 and 5, the left control handle 44 can be moved rearwardly and thereby pull brake cable 160 forwardly so as to cause brake calipers 162 to pinch the rim of rear tire 34 and thereby apply a braking force. Once applied the brake may be disengaged by merely releasing the control handle 44.

As can be seen in FIG. 2 a coil spring 127 is positioned between joy stick 122 and brake cable mounting bracket 126. Coil spring 127 is positioned so as to bias control handle 44 in a counterclockwise direction about pin 125 when control handle 44 is moved rearwardly and the brake applied. Accordingly, when handle 44 is released it is pulled forwardly and the braking force released. Similar brake actuation is provided between control handle 46 and rear brake calipers 164.

It can be seen that by providing gear shifting, steering and braking controls within a single hand-gripped control handle, the operation of the cart 10 is greatly facilitated. No gross changes in the driver's body position are required to shift, steer or brake the cart and the driver's feet may be kept in constant engagement with the pedals so as to maximize the power supplied to the drive train.

Moreover, the dual derailleur system, and particularly the provision and arrangement of the upper and lower transfer sprockets 64,68 allows for an efficient raised pedaling position of pedal crank 42 and for the maintenance of a low center of gravity of the intermediate drive sprocket, rear chain, and rear derailleur.

Figure 6:
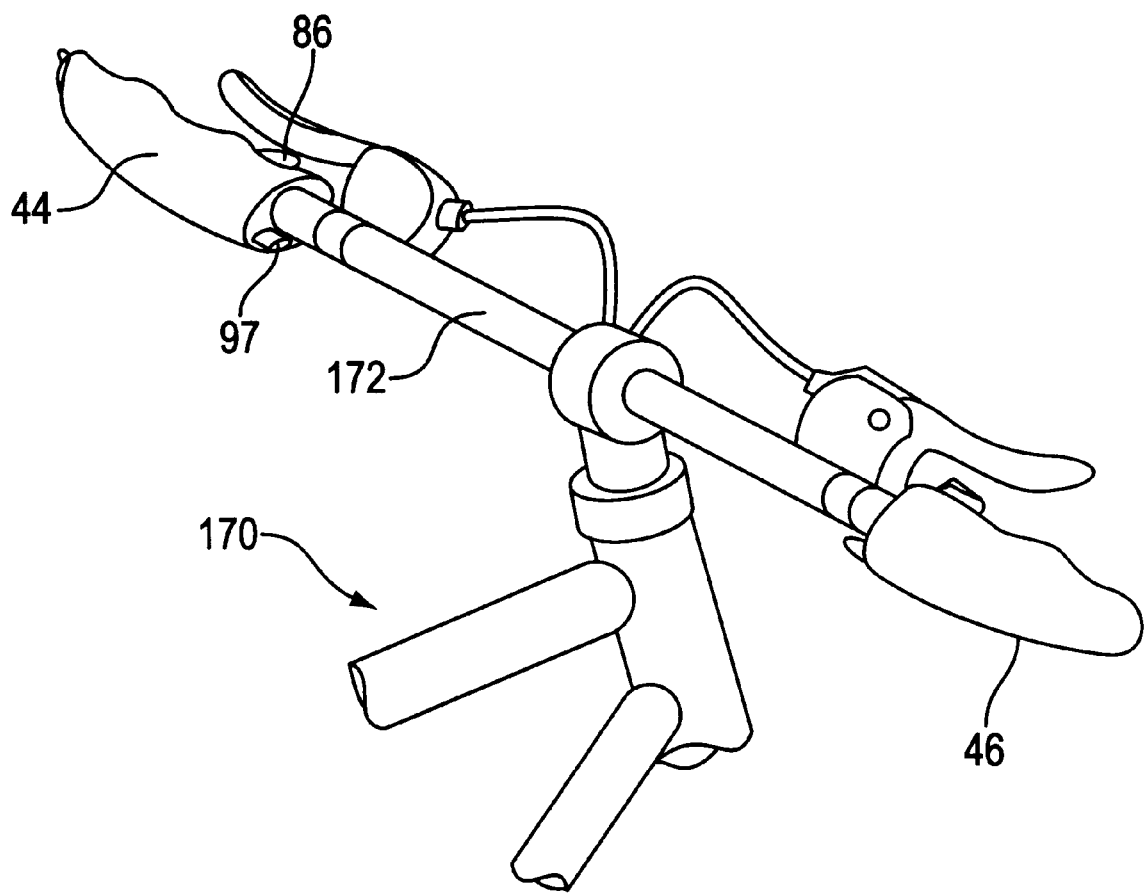
FIG. 6 is a schematic perspective view of a multi-purpose control handle fitted to a bicycle handle bar in accordance with the invention.

There has been disclosed heretofore the best embodiment of the invention presently contemplated. However, it is to be understood that various changes and modifications may be made thereto without departing from the spirit of the invention. For example, the control handles 44,46 as described above can be easily adapted for use with a bicycle 170 as shown in FIG. 6 so as to allow a rider to keep a firm grip on the handle bars 172 while shifting gears.

In this case, the left control handle 44 can be easily modified to provide an upshift with thumb actuator 97 and a downshift with trigger 86. The relatively large size of the control handles allows for large tolerances and lower manufacturing costs.

What is claimed is:

1. A foot pedalled cart, comprising:
   a chain driven transmission providing a variable drive ratio;
   a steering system for steering said cart;
   a braking system for braking said cart;
   a first multi-function control handle operatively connected to said transmission, said steering system and to said braking system;
   wherein said first multi-function control handle comprises a ratchet mechanism operatively associated with said transmission; and
   a first actuator selectively engageable with said ratchet mechanism;
   wherein said ratchet mechanism comprises a plurality of ratchet pawls and wherein said first actuator comprises a trigger having a plurality of abutment portions respectively engageable with said ratchet pawls.

2. A foot pedalled cart, comprising:
   a chain driven transmission providing a variable drive ratio;
   a steering system for steering said cart;
   a braking system for braking said cart; and
   a first multi-function control handle operatively connected to said transmission, said steering system and to said braking system;
   said transmission having a first derailleur and said first multi-function control handle having a mechanism for actuating said first derailleur;
   further comprising a second multi-function control handle and said transmission further having a second derailleur operatively associated with and actuated by said second multi-function control handle;
   wherein said first control handle includes a first unidirectional trigger operatively connected to said first derailleur and said second control handle includes a second unidirectional trigger operatively associated with said second derailleur and wherein said unidirectional actuation of said first trigger increases said drive ratio and said unidirectional actuation of said second trigger increases said drive ratio.

3. A foot pedalled cart, comprising:
   a chain driven transmission providing a variable drive ratio;
   a steering system for steering said cart;
   a braking system for braking said cart;
   a first multi-function control handle operatively connected to said transmission, said steering system and to said braking system;
   wherein said first multi-function control handle comprises a ratchet mechanism operatively associated with said transmission, and a first actuator selectively engageable with said ratchet mechanism;
   wherein said first multi-function control handle comprises a second actuator selectively engageable with said ratchet mechanism.

4. The cart of claim 3, wherein said ratchet mechanism comprises a ratchet having a plurality of ratchet teeth and wherein said second actuator comprises a push button having a ratchet pawl selectively engageable with said ratchet teeth.

5. A foot pedalled cart, comprising:
   a chain driven transmission providing a variable drive ratio;
   a steering system for steering said cart;
   a braking system for braking said cart;
   a first multi-function control handle operatively connected to said transmission, said steering system and to said braking system;
   said transmission having a first derailleur and said first multi-function control handle a mechanism for actuating said first derailleur;
   further comprising a second multi-function control handle, and said transmission further having a second derailleur operatively associated with and actuated by said second multi-function control handle;
   wherein said first control handle comprises a first push button operatively connected to said first derailleur and said second control handle comprises a second push button operatively associated with said second derailleur and wherein actuation of said first push button decreases said drive ratio and actuation of said second push button decreases said drive ratio.

6. A human powered cart comprising:
   a body having a front portion,
   a rear portion,
   a seat, a floor,
   a back rest,
   a first outer side wall,
   and a central crank housing extending upwardly from a central portion of said floor,
   at least one steerable front wheel mounted in said front portion,
   a pair of non-steerable rear wheels mounted in said rear portion wherein the axis of rotation of each said rear wheel is substantially collinear, a pedal crank rotatable mounted in said central crank housing, a variable ratio transmission with an input and an output, wherein said input is operatively coupled to said pedal crank and said output is operatively coupled to at least one of said rear wheels, a first means for shifting said transmission, a second means for shifting said transmission, means for braking at least one of said rear wheels, means for steering said front wheels, wherein said transmission further includes:
  a primary drive sprocket connected to said pedal crank;
  a forward drive chain engaged with said primary drive sprocket;
  a forward gear set engaged with said forward drive chain and having a plurality of forward speed change sprockets;
  a forward derailleur engaged with said forward drive chain for selectively shifting said forward drive chain into and out of engagement with said forward speed change sprockets;
  an upper chainwheel rotatable with and driven by said forward gear set;
  a transfer chain engaged with said upper chainwheel;
  an intermediate transfer sprocket engaged with said transfer chain;
  a secondary drive sprocket rotatable with and driven by said intermediate transfer sprocket;
  a rear drive chain engaged with said secondary drive sprocket;
  a rear gear set engaged with said rear drive chain and comprising a plurality of rear speed change sprockets;
  a rear derailleur engaged with said rear chain for selectively shifting said rear drive chain into and out of engagement with said rear speed change sprockets;
  at least one said rear wheel rotatably driven by said rear gear set;
  said forward gear set and said rear gear set operating in combination to provide an incremental gear range from a lowest gear to a highest gear;
  whereby an operator inputs mechanical power from his feet to said pedal crank and said transmission outputs said power to at least one rear wheel.

7. A human powered cart as in claim 6 wherein said forward gear set is mounted to said central crank housing.

8. A human powered cart as in claim 6 and further comprising:

a first multi-function control handle mounted in said first outer side wall and operatively connected to said front derailleur, said steering means, and said first braking means, said first control handle having a ratchet mechanism operably associated with said transmission, said ratchet mechanism having a plurality of ratchet pawls operable by a first actuator and a second actuator, said first actuator comprising a trigger having a plurality of abutment portions respectively engageable with said ratchet pawls, said second actuator comprising a push button selectively engageable with said ratchet teeth, said first control handle having an independent longitudinal degree of freedom, wherein said control handle being displaced in a longitudinal direction activates a first braking means, and said first control handle having a latitudinal degree of freedom, wherein said control handle being displaced in lateral direction activates said steering means.

9. A human powered cart as in claim 6 and further comprising:

a first multi-function control handle mounted in said first outer side wall and operatively connected to said front derailleur, said steering means, and said first braking means, a second multi-function control handle mounted in said second outer side wall and operatively connected to said rear derailleur, said steering means, and said second braking means, each said control handle having a ratchet mechanism operably associated with said transmission, each said ratchet mechanism having a plurality of ratchet pawls operable by a first actuator and a second actuator, said first actuator comprising a trigger having a plurality of abutment portions respectively engageable with said ratchet pawls, said second actuator comprising a push button selectively engageable with said ratchet teeth, each said control handle having an independent longitudinal degree of freedom, wherein said first and second control handles being displaced in a longitudinal direction respectively activate a first and second braking means, and each said control handle having a latitudinal degree of freedom and being mechanically linked to the other wherein they move cooperatively in lateral displacement to activate said steering means.

10. A human powered cart as in claim 8 wherein:

each single activation of a said push button shifts said transmission to a lower gear within said gear range; and each single activation of a said trigger shifts said transmission to a higher gear within said gear range.

11. A human powered cart as in claim 9 wherein:

each single activation of a said push button shifts said transmission to a lower gear within said gear range; and each single activation of a said trigger shifts said transmission to a higher gear within said gear range.

* * * * *